Patented Oct. 16, 1945

2,387,204

UNITED STATES PATENT OFFICE 2,387,204

METHOD OF MAKING BERYLLIUM FLUORIDE

Charles B. Willmore, New Kensington, Pa., and Frank D. Chew, Detroit, Mich., assignors to Aluminum Company of America, Pittsburgh, Pa., a corporation of Pennsylvania No Drawing. Original application April 24, 1943, Serial No. 484,476. Divided and this application February 20, 1945, Serial No. 578,940

2 Claims. (Cl. 23—88)

This invention relates to the production of beryllium fluoride, which compound is usable as a source of metallic beryllium as well as for other purposes. The principal object of this invention is the provision of methods by which beryllium may be extracted in the form of a fluoride from siliceous beryllium ores such as, for example, the mineral beryl. Beryl is a beryllium-aluminum silicate generally described by the formula $Be_3Al_2(Si_6O_{18})$. It can be considered, for practical purposes, as being composed of the oxides of beryllium, aluminum and silicon. Theoretically it contains about 5 per cent by weight of beryllium, although, as mined, it often contains as little as 3.5 per cent of that metal. A further object of the invention is the provision of methods by which beryllium oxide, or materials or mixtures containing the same, may be treated to form beryllium fluoride. A further object is to provide methods by which these objects may be achieved by treatments which do not involve the use of chemical solutions.

The invention provides a process in which the material which is used as the source of beryllium is mixed with magnesium fluoride, and the mixture heated to cause reaction between the components thereof and the evolution therefrom of a vapor containing beryllium, which vapor may then be condensed and the condensate used or, if desirable or necessary, further treated to recover beryllium fluoride in substantially pure form. We have found that the temperatures neccessary to promote the reaction in such a mixture are low, particularly when reduced pressures are used, and thus compatible with commercial operating conditions and available equipment. We have found that the results of the reaction as to both yield and quality are improved by eliminating or rendering inactive the silica present in the ore. We have found that the presence of aluminum oxide promotes the reaction between the beryllium oxide and the magnesium fluoride. We have found that aluminum fluoride promotes or helps the reaction.

When beryl, or other siliceous ore of beryllium, is the substance to be treated, it is first desirable to eliminate therefrom all or a greater part of the silica prior to the treatment with magnesium fluoride. Otherwise the yield of beryllium fluoride produced by the reaction is low, the cost of handling the reaction is high, and the results of the process unsatisfactory. To eliminate the silica may not, within the sense of this invention and within the meaning of this phrase as used in the claims, mean the actual physical removal of the silica from the ore or the reaction mixture, although this may, if desired, be effected; rather it means that the silica is either removed or converted in situ to silicon or to a silicon compound which does not readily react with the magnesium fluoride in the heating of the mixture of magnesium fluoride and source of beryllium or otherwise render ineffective the fluorine of the magnesium fluoride. The step of eliminating the silica from the ore may therefore consist of any one of several treatments which will either reduce the silica to metallic silicon or will change the silica to a compound which is stable, as regards aluminum fluoride, at the temperatures of the proposed reaction. While there are several such treatments, we prefer the following which have given good results and are also indicative of methods by which the silica may, in the sense of this invention, be eliminated from the ore.

(a) The beryl, or other siliceous ore, is first ground to a finely divided form and is mixed with sufficient carbon to reduce its predetermined silica content. Iron is also added to the mixture. The mixture is then heated at high temperature such as 1900° C. or higher with the result that the silica is reduced to metallic silicon which then alloys with the iron to form ferrosilicon which may be tapped off or allowed to remain with the resultant slag which is composed of the oxides of beryllium and aluminum and is substantially free of silica.

(b) The same mixture as is described above is heated at a temperature high enough to cause the silica to be reduced and permit the silicon to alloy with the iron to form ferro-silicon, but not high enough to melt the oxides of beryllium and aluminum. For example, a temperature of 1300° C. or higher may be used satisfactorily. The ferro-silicon formed is not separated from the rest of the charge.

(c) The beryl is mixed with sufficient carbon to reduce the silica according to the reaction $$Be_3Al_2(SiO_3)_6 + 18C = 3BeO + Al_2O_3 + 6SiC + 12CO$$

and the mixture heated to temperatures of about 1500 to 1800° C. to produce said reaction, thus producing a mass consisting of the oxides of beryllium and aluminum and the product of the reduction of the silica which may be the product indicated by the reaction formula.

In processes such as the ones just specifically described, the silica is eliminated (or converted so that it is inactive—which is the same) leaving the desired beryllium oxide mixed with aluminum oxide. This is a convenience in the practice of the invention because, as we have discovered, the presence of aluminum oxide increases the efficiency of the reaction between the beryllium oxide and the magnesium fluoride in the sense of producing a larger yield of beryllium fluoride per unit of reaction time at a given temperature. Where the process by which the beryl is treated to eliminate the silica also converts the aluminum present to a non-oxidic compound or where the siliceous ore being processed does not contain aluminum compound which remains as aluminum oxide after the elimination of the silica, it is desirable, in accordance with the principles of this invention, to add to the reaction between the beryllium compound and the magnesium fluoride, some aluminum oxide.

The silica having been eliminated from the siliceous ore, the ore is then mixed with magnesium fluoride and the mixture heated to produce beryllium fluoride in vapor form. For this purpose the reactants are reduced to a finely divided form—preferably 100 mesh size or smaller—and thoroughly mixed. If preferred, this mixture may then be briquetted to prevent dusting and to achieve more intimate contact of the components thereof, or it may be used in non-compacted form. If the bonding materials used in making the briquettes contain volatile materials, these should preferably be driven off by a preliminary heating at less than reaction temperatures.

The reaction mixture thus formed is then heated. If the heating takes place at atmospheric pressures, the temperature should be maintained at at least 1200° C., and for best results a temperature of at least 1400° C. is preferred. If the reaction is conducted at reduced pressures, lower temperatures can be employed. For equivalent results a lowering of the temperature by about 200° C. from that required at atmospheric pressures may be achieved when the residual pressures are low.

At these temperatures the reaction proceeds to the production of beryllium fluoride in vapor form and the vapor is drawn or led from the reaction mass to a relatively cool condensing surface where it is condensed and thus recovered. The condensate may contain other substances, notably aluminum fluoride as well as, for instance, alumina. If desired, such additional substances may be removed from the beryllium fluoride by mechanical separation, by melting the mixed materials and allowing the beryllium fluoride and the impurities to form separate layers or by fractional distillation and condensation. The latter method is preferred where the highest purity is desired in the final product.

It will be noted that in the complete process of treating the beryl or other siliceous ore to obtain beryllium fluoride, it is often possible to combine the step of eliminating the silica content of the ore with the step of converting the beryllium content of the ore to beryllium fluoride in vapor form. To some extent the advisability of such combination will be controlled by the comparative temperatures necessarily employed in the two steps as well as the physical limitations of the apparatus employed.

When an ore of beryllium which does not contain substantial amounts of aluminum oxide or does not, as the result of the elimination of any silica present, eventually contain aluminum in oxide form or when pure beryllium oxide is used as the source of beryllium, we have found that the addition to the reaction mixture of aluminum oxide will increase the efficiency of the reaction. The exact action of the aluminum oxide is not entirely understood, but it is apparently inert during the reaction and does not appear to enter into it. When present in amount as low as 10 per cent by weight of the reaction mixture, its effect is noticeable. The amount of aluminum oxide which will give the results under the operating conditions obtaining may be easily determined by trial.

The addition to the reaction mass of aluminum fluoride will also increase the yield of beryllium fluoride obtained in a given time by the practice of the methods of this invention. This is true even when the aluminum fluoride added replaces a part of the magnesium fluoride and thus does not increase the fluorine available to the reaction. However, we do not here claim the treatment of beryllium-containing substances with mixtures of aluminum fluoride and magnesium fluoride since that is claimed in our copending application Serial No. 484,477 filed of even date herewith.

The benefits of the practice of our invention are illustrated by the following examples. In the runs represented by these examples the indicated reactants were thoroughly mixed, briquetted and then heated at the temperatures and pressures stated, the vapor thus produced being condensed and the sublimate analyzed for beryllium fluoride content.

*Example 1*

Beryllium oxide and magnesium fluoride were mixed in proportion of about 1 part by weight of BeO to 3 parts by weight of $MgF_2$ and then heated for 8 hours at temperatures of 1000° to 1200° C. at residual pressures of 0.2 to 1.6 millimeters of mercury. The sublimate contained beryllium fluoride to the extent of 21.5 per cent by weight of the amount theoretically available from the reaction.

*Example 2*

A mixture composed of about 20 per cent by weight of BeO, 51 per cent by weight of $MgF_2$ and 28 per cent by weight of $Al_2O_3$ was processed under the conditions set forth in Example 1. The sublimate contained beryllium fluoride to the extent of 32.5 per cent by weight of the amount theoretically available from the reaction. Thus the practice, in Example 2, of the process of the invention resulted in a recovery of beryllium fluoride about 50 per cent in excess of the recovery obtained in Example 1.

*Example 3*

A mixture composed of about 80 per cent by weight of beryl and 20 per cent by weight $MgF_2$ was heated for 4 hours at 1200° C. and at a residual pressure of 24 millimeters of mercury. The sublimate contained only about 20 per cent of the amount of beryllium fluoride theoretically available from this mixture.

*Example 4*

The mixture contained 53.8 per cent by weight of beryl, 14.8 per cent by weight of magnesium fluoride and 31.4 per cent by weight of carbon. The mixture was heated in the same manner as was the mixture in Example 3, the residual pressure during treatment being about 23 millimeters of mercury. The sublimate contained about 37 per cent of the amount of beryllium fluoride theoretically available from this mixture.

*Example 5*

A slag containing about 37.2 per cent of BeO and 62.8 per cent of $Al_2O_3$ was mixed with $MgF_2$, the mixture containing about 48.7 per cent by weight of slag, the balance being $MgF_2$. This mixture was heated for 8 hours at 1200° C. at a residual pressure varying between 0.2 to 2 millimeters of mercury. The resultant sublimate contained about 94 per cent of the amount of beryllium fluoride theoretically available from this mixture.

*Example 6*

A mixture containing beryl, magnesium fluoride and sufficient metallic aluminum to react with the silica of the beryl and eliminate it by reducing it to metallic silicon was prepared. This mixture, composed of 51 per cent by weight of beryl, 31.2 per cent by weight of metallic aluminum and 17.8 per cent of $MgF_2$, was first heated for 1 hour at 1200° C. at atmospheric pressure to promote the reaction between the metallic aluminum and the silica. The mixture was then heated for 8 hours at temperatures of 1000° to 1200° C. at residual pressures of 0.15 to 0.35 millimeters of mercury. The sublimate contained 70.2 per cent of the amount of beryllium fluoride theoretically available from this mixture.

From these examples it is readily apparent that the elimination of silica from the beryl increases the efficiency of the reaction (compare Example 3 with Examples 4 and 6), and that the presence of aluminum oxide increases the efficiency of the reaction (compare Examples 1 and 3 with Examples 2, 4, 5 and 6).

This application is a division of our copending application, Serial No. 484,476, filed April 24, 1943.

We claim:

1. The method of recovering beryllium values in the form of beryllium fluoride from siliceous beryllium ores which comprises forming a mixture containing ore, magnesium fluoride and a substance capable of reaction with the silica of the ore to eliminate said silica, heating the mixture at temperatures of over about 1000° C. and condensing the resultant vapor.

2. The method of recovering beryllium values in the form of beryllium fluoride from siliceous beryllium ores which comprises forming a mixture containing magnesium fluoride, an ore containing beryllium and aluminum compounds, and a substance capable of reaction with the silica of the ore to eliminate said silica, heating the mixture at temperatures of over about 1000° C. and condensing the resultant vapor.

CHARLES B. WILLMORE.
FRANK D. CHEW.

---

Certificate of Correction

October 16, 1945.

Patent No. 2,387,204.

CHARLES B. WILLMORE ET AL.

It is hereby certified that error appears in the printed specification of the above numbered patent requiring correction as follows: Page 1, second column, line 45, strike out the formula and insert instead the following

$$Be_2Al_2(SiO_3)_6 + 18C = 3BeO + Al_2O_3 + 6SiC + 12CO;$$

and that the said Letters Patent should be read with this correction therein that the same may conform to the record of the case in the Patent Office.

Signed and sealed this 1st day of January, A. D. 1946.

[SEAL]

LESLIE FRAZER,
*First Assistant Commissioner of Patents.* per cent of the amount of beryllium fluoride theoretically available from this mixture.

*Example 5*

A slag containing about 37.2 per cent of BeO and 62.8 per cent of $Al_2O_3$ was mixed with $MgF_2$, the mixture containing about 48.7 per cent by weight of slag, the balance being $MgF_2$. This mixture was heated for 8 hours at 1200° C. at a residual pressure varying between 0.2 to 2 millimeters of mercury. The resultant sublimate contained about 94 per cent of the amount of beryllium fluoride theoretically available from this mixture.

*Example 6*

A mixture containing beryl, magnesium fluoride and sufficient metallic aluminum to react with the silica of the beryl and eliminate it by reducing it to metallic silicon was prepared. This mixture, composed of 51 per cent by weight of beryl, 31.2 per cent by weight of metallic aluminum and 17.8 per cent of $MgF_2$, was first heated for 1 hour at 1200° C. at atmospheric pressure to promote the reaction between the metallic aluminum and the silica. The mixture was then heated for 8 hours at temperatures of 1000° to 1200° C. at residual pressures of 0.15 to 0.35 millimeters of mercury. The sublimate contained 70.2 per cent of the amount of beryllium fluoride theoretically available from this mixture.

From these examples it is readily apparent that the elimination of silica from the beryl increases the efficiency of the reaction (compare Example 3 with Examples 4 and 6), and that the presence of aluminum oxide increases the efficiency of the reaction (compare Examples 1 and 3 with Examples 2, 4, 5 and 6).

This application is a division of our copending application, Serial No. 484,476, filed April 24, 1943.

We claim:

1. The method of recovering beryllium values in the form of beryllium fluoride from siliceous beryllium ores which comprises forming a mixture containing ore, magnesium fluoride and a substance capable of reaction with the silica of the ore to eliminate said silica, heating the mixture at temperatures of over about 1000° C. and condensing the resultant vapor.

2. The method of recovering beryllium values in the form of beryllium fluoride from siliceous beryllium ores which comprises forming a mixture containing magnesium fluoride, an ore containing beryllium and aluminum compounds, and a substance capable of reaction with the silica of the ore to eliminate said silica, heating the mixture at temperatures of over about 1000° C. and condensing the resultant vapor.

CHARLES B. WILLMORE.
FRANK D. CHEW.

---

Certificate of Correction

October 16, 1945.

Patent No. 2,387,204.

CHARLES B. WILLMORE ET AL.

It is hereby certified that error appears in the printed specification of the above numbered patent requiring correction as follows: Page 1, second column, line 45, strike out the formula and insert instead the following

$Be_2Al_2(SiO_3)_6 + 18C = 3BeO + Al_2O_3 + 6SiC + 12CO;$ and that the said Letters Patent should be read with this correction therein that the same may conform to the record of the case in the Patent Office.

Signed and sealed this 1st day of January, A. D. 1946.

[SEAL]

LESLIE FRAZER,
*First Assistant Commissioner of Patents.*